United States Patent Office 3,720,120
Patented Mar. 13, 1973

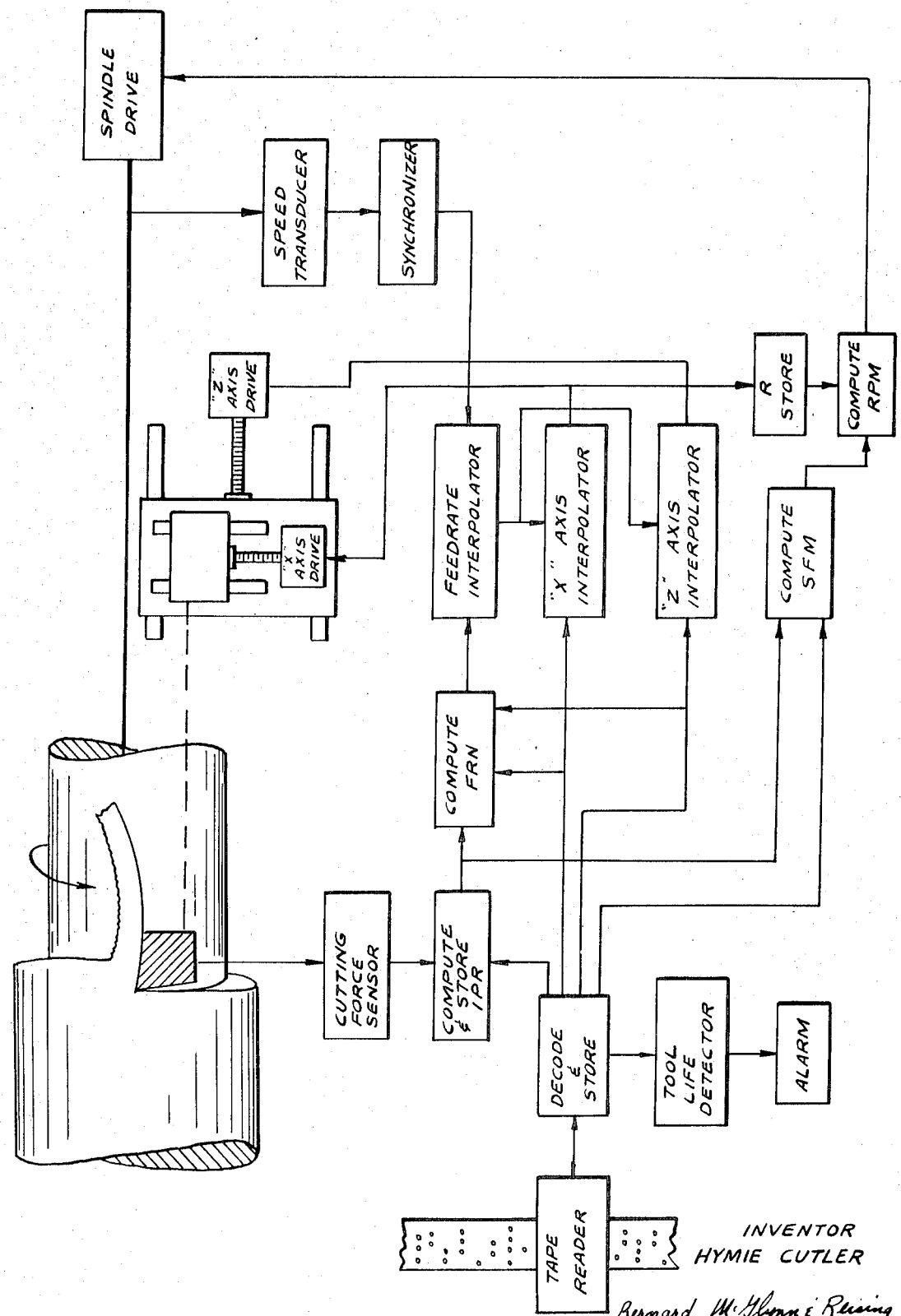

3,720,120
NUMERICAL CONTROL SYSTEM ADAPTIVE TO WORKPIECE HARDNESS
Hymie Cutler, Detroit, Mich., assignor to
The Bendix Corporation
Filed Sept. 21, 1970, Ser. No. 73,811
Int. Cl. B23b 7/00
U.S. Cl. 82—2 B  13 Claims

ABSTRACT OF THE DISCLOSURE

A stored program computer uses input numerical information to control the path of motion of a lathe cutter relative to the lathe spindle. The system also controls the rate of motion of the cutter along its path and the rate of rotation of the spindle in such a way as to attain a predetermined useful cutter life and a maximum volume of metal removal by the cutter during that life. The force exerted by the cutter on the workpiece is measured by a transducer to produce a signal which is operated upon in connection with information on the tape to produce an inches-per-revolution number. This number is multiplied by a number derived from a spindle speed transducer to develop a feedrate number to control the rate of operation of interpolators which generate control signals for the two mutually perpendicular cutter drive axes. The inches-per-revolution number is also operated upon by information obtained from the tape and a number proportional to the normal distance between the cutter and the spindle axis to develop a drive signal for the spindle.

Field of the invention

This invention relates to a numerical control system for a lathe which is adaptive to the hardness of a workpiece being cut to control the rate of spindle rotation and the feedrate to achieve a predetermined cutter life and a maximum volume of metal removal during such life.

Background of the invention

Contouring type numerical control systems operative to control the path of motion of the cutter of a machine tool relative to a workpiece being operated on by the machine in accordance with input numerical data are in widespread use. The numerical information provided to the system may include, in addition to data relative to the desired path of motion, information relative to the rate of motion of the cutter along that path, and the rate of rotation of the machine spindle.

The exact conditions which the machine will encounter in forming a specific workpiece are unknown to the programmer when he prepares the numerical information and he must consider the worst case that may be encountered and accordingly program conservative rates of cutter feed and spindle rotation. The most important variable that the programmer has to deal with is the hardness of the workpiece being formed, which may vary over wide ranges as the result of particular alloying elements in the metal, variations in heat treatment, or work hardening of the material as the result of previous machine passes. The programmer thus includes relatively low rates of feed and speed suitable for cutting the hardest material which may be encountered, and in operation the higher production rates which would be possible if the material is softer than that programmed for are sacrificed. Alternatively, the system may provide manual data entry means which an operator can use to override the programmed feed and speed values. However, the operator often cannot recognize and respond to the adverse cutting conditions sufficiently rapidly to avoid tool or workpiece damage and moreover tends to be conservative in overriding the programmed rates, resulting in inefficient system performance.

In order to obviate these disadvantages, adaptive numerical control systems have been devised which make measurements of parameters associated with the actual cutting operation, such as cutter torque or force, tool vibration, tool temperature, etc., and which control the feeds and speeds either in one of several alternative mode,s i.e., in an optimizing manner using the feedback measurements to calculate parameters, of machine efficiency, in a closed loop manner the control signals being direct functions of the measured parameters, or in an optimizing manner within boundaries which are preset into the system and are guarded by the feedback signals.

The present invention relates to such an adaptive system wherein the cutter feed and spindle speed of a lathe are controlled in a closed loop manner as a function of workpiece hardness as determined by a measurement of the cutting force exerted by the tool to achieve an approximate predetermined life for the machine cutter, and to optimize the quantity of metal removed by the cutter during that life.

The desirability of controlling the feeds and speeds so as to achieve a predetermined tool life arises from the relationship between the cost of producing parts on the machine, the tool life, and the production rate. By employing low levels of cutting speed and chip-load very long tool life may be achieved and the aggregate metal removal during that tool life may be maximized but the production rate of the machine is very low. At the other extreme, high cutting speeds and chip-loads will minimize the time required to form a single part and thus maximize short term production rate, but the tool life will be greatly shortened, requiring frequent tool changes with high attendant down-time, and thus decreasing the effective long-term production rate. Also, the aggregate metal removal during the tool life will be very low, raising the tooling cost attributable to the production of each part. Intermediate these extremes there are values of tool life which will minimize part cost or maximize profit per part based on the consideration of the machining and operator cost per minute, the cost of the tool, and the time it takes to change a tool and restart the program.

By producing a predictable tool life not only can cost be optimized, but the changing of the tool by the operator may be programmed. The expected tool life may be introduced into the system from numerical data and continually compared with the time a particular tool has been used to provide an output signal instructing the operator to change the tool when the two are equal. This eliminates the need for the operator to periodically inspect the tool for degree of wear and exercise judgment as to when it is ready for replacement.

In order to achieve this programmed rate of tool wear independently of variations in hardness of the workpiece the feeds and speeds are controlled as a function of hardness. The instantaneous hardness of the workpiece is measured by the cutting force exerted on the tool since the force acting on the tool will be a function of the area of the chip section being cut and the difficulty of shearing that chip from the workpiece. The harder the workpiece the greater the resistance will be to shearing the chip. Thus, for constant chip-loads, that is, constant depth of cut and feedrate, the magnitude of the force acting on the tool will be a function of the hardness of the workpiece. This quantity could be made constant simply by adjusting the feedrate in response to sensed variations in torque or hardness without any adjustment of the cutting speed or spindle speed. However, since tool life is a function of cutting speed as well as chip-load and workpiece hardness, and their relationship is not linear, adjustment of the cutting speed is necessary to maintain a constant tool wear for differing values of hardness and feedrate. Since the cutting speed has a considerably greater effect on the rate of tool wear than does the feedrate, a relatively minor modification of cutting speed can compensate for large variations in workpiece hardness. As the metal removal rate is the product of the cutting speed and the chipload, the production loss with the reduction of the cutting speed will be relatively small. Thus, the adaptive technique of the present invention maintains programmed tool life in such a manner as to achieve maximum metal removal rate during that tool life.

The preferred embodiment of the present invention, which will subsequently be disclosed in detail, controls the machine feedrate as a function of the rate of rotation of the spindle. It controls the spindle speed as a function of the radius of the part being cut so that the control values may be expressed in surface feet-per-minute, independent of the part radius. A single control value is used in the derivation of the inches-per-minute of the feed and the surface feed-per-minute of the spindle speed. This value, the tool cutting force set point, is derived using taped information which includes the depth of cut. The feed in terms of IPR will be established such that the measured tool cutting force is equal to the set point value. The speed in terms of SFM will be calculated using the value of IPR so determined. The inches-per-revolution signal is derived in such a manner as to maintain the chip-load, as determined by the feedrate, the depth of cut, and the cutting speed, at such values as will avoid successive forces on the tool which will cause breakage. For a given depth of cut this maximum safe-cutting tool force can be calculated from empirical data and this calculation may either be done off-line by the programmer or on-line by the stored program computer. This cutting-force set point is continually compared to the measured cutting force, and the IPR value is modified as a function of the ratio between the two. This modification is done periodically to give the control time to settle down between changes in values.

By causing the value of the SFM to be calculated from the value of the IPR the cutting speed will be varied with the hardness of the workpiece. This is so because the IPR that is determined by this process will be a measure of workpiece hardness.

In the preferred embodiment of the invention the control derives an IPR signal from the measured cutting force and from the programmed depth of cut. In alternative embodiments the depths of cut might be directly measured with a suitable probe or might be calculated from the programmed path data. The IPR signal developed is inversely proportional to workpiece hardness and is accordingly a measure of the hardness and the feedrate is controlled as a direct function of this value and of the spindle speed. The cutting rate in terms of surface feet-per-minute is calculated from the IPR signal using an equation that is derived by empirical tests of the value of IPR that will achieve a particular tool life under varying values of cutting speed and depth of cut. Since the tool force is a function of both feedrate and depth of cut and the workpiece hardness and is relatively independent of the cutting speed, the feedrate is allowed to inversely follow the workpiece hardness and the cutting speed is adjusted to achieve the programmed tool life for that given workpiece hardness.

It is therefore seen to be a primary object of the invention to provide a numerical control system which adaptably modifies the cutter feeds and spindle speeds as a function of workpiece hardness in order to achieve a predetermined optimum cutter life and maximum metal removal during that life.

Other objects, advantages and applications of the present invention will be made apparent by the following detailed description of the preferred embodiment of the invention. The description makes reference to the accompanying drawing which illustrates the preferred embodiment in partially block, partially schematic form.

Referring to the drawing, the preferred embodiment of the invention takes the form of a numerical control system for a lathe schematically illustrated in FIG. 1 as operating upon a workpiece 10. The workpiece is rotated by a spindle drive 12 and is operated upon by a cutter 14 fed radially with respect to the axis of rotation of the workpiece by an axis drive 60 and along the axis of rotation of the workpiece by a Z axis drive 18. The X axis drive 16 moves the cutter 14 along a pair of ways 20 and is itself supported on a slide 22 which is driven along a pair of ways 24 by the Z axis drive 18.

The system of the present invention is operative to provide control signals for the spindle drive 12, the axis drive 16, and the Z axis drive 18 in accordance with information contained on a storage media which preferably takes the form of a conventional 8 channel punched tape 28. The control tape is encoded in binary-coded-decimal form with each alpha-numeric symbol extending across the width of the tape. The tape includes certain introductory information blocks containing information which remains constant for the entire cutting operation. It also includes a series of blocks each of which defines one segment of the command motion and provides other information used in connection with that segment. In the preferred embodiment an introductory block will contain the following information:

| Quantity | Least significant digit | Unit | Mnemonic |
| --- | --- | --- | --- |
| Tool life expectancy | 0.1 | Minutes | TL. |
| Maximum IPR | 0.0001 | IPR | Max. IPR. |
| Minimum IPR | 0.0001 | IPR | Min. IPR. |
| Cutting force constant: | | | |
| Zero depth of cut | 1.0 | Pounds | FCO. |
| Per depth of cut | 1.0 | Pounds per inch depth of cut. | FCK. |
| Maximum, S.f.m | 0.1 | S.f.m | Max. s.f.m. |
| Minimum, S.f.m | 0.1 | S.f.m | Min. s.f.m. |
| Cutting speed: | | | |
| Scaling | 10,000 | | CSK. |
| Exponent constant | .01 | | CSQ. |

A typical segment block included on the tape will contain a code identifying it as a block of information, a delta X numer, a delta Z number, a Depth of Cut number expressed in thousands of an inch, and an end of block code. All of this information is encoded in accordance with conventional numerical control practice.

The information contained on the tape is converted into electrical form by a tape reader 30, which reads one character at a time, and is provided to a decode and storage unit 32 operative to determine the routing of each piece of information and store it until required by the system. The decode and storage unit also controls the advance of the tape reader 30. The information provided during an introductory block is maintained by the decode and storage unit 32 during the entire machine operation, while the information contained in each block is only stored until the next block is read.

The decode and storage unit 32, as well as all the other electronic units other than the tape reader and interpolators, are described as having separate identities only for purposes of illustration, but in the preferred embodiment of the invention their functions are performed by an appropriately programmed general purpose computer. In the preferred embodiment of the invention this computer is a Micro Systems Model 810 Computer. In alternate embodiments other larger and faster computers might be employed or the system might be hard wired. The operation of the units which are included within the general purpose computer will be described in functional terms in sufficient detail to allow a systems analyst, experienced in real-time systems, to design an appropriate control program for any sufficiently large computer which will cause it to perform the desired operations, or to allow a skilled digital circuit designer to develop hard wired apparatus for performing these functions.

The tool life expectancy data, TL, is provided by the unit 32 to a tool life detector 34 which also measures the time during which the cutting operation is in progress. These two numbers are continually compared and when they are equal some form of appropriate alarm 36, such as a signal light or horn, is energized to inform the machine operator that the time has come to change a tool. This relieves the operator of the task of regularly inspecting the tool for wear.

The quantities FCO, FCK, Depth of Cut, Max IPR and Min IPR, are used to compute an IPR quantity, and this function of the computer is illustrated as being performed by a unit 38.

The unit 38 also receives the output of a cutting force sensor connected to the tool 14 which measures the normal force exerted by the workpiece on the cutter. In the preferred embodiment of the invention this force measurement is achieved by placing strain gauges on the bolts which retain the tool turret to its mounting but other well known techniques for measuring this normal force and generating electrical signal proportional to it may be employed.

The unit 38 first computes a cutting force set point which is a function of the depth of cut in accordance with the following equation:

$$\text{set point} = FCO + (D \cdot FCK)$$

The constants FCO and FCK are determined emperically by a series of tests which determine the maximum safe force which may be imposed on the tool for any particular depth of cut. These emperical values are only valid for a particular form of cutting tool and must be modified when the cutting tool is changed. The set point, as well as the output of the cutting force sensor, is periodically used to calculate and update an IPR signal in accordance with the following equation:

$$\text{New IPR} = \frac{\text{Set Point Force}}{\text{Actual Cutting Force}} \times \text{Old IPR}$$

This calculation is made at regular intervals and effectively adaptably increases IPR as a percentage of its departure from the set point until it equals this set point. This calculated value of IPR is compared with the maximum and minimum values and if it exceeds these limits the limiting value is used by the system rather than the calculated value.

The IPR number so chosen is then used to calculate a feedrate number (FRN). This function is performed by the programmed controller and is illustrated as being performed in a unit 42 which receives the IPR number, and the delta X and delta Z numbers from the decode and storage unit 32. The computation consists of solving the equation:

$$FRN = \frac{IPR \cdot K}{\sqrt{\Delta X^2 + \Delta Z^2}}$$

where K is a system constant which need not be changed.

The feedrate number is used in connection with pulse train derived from a transducer 46 which is connected to the spindle drive 12 by appropriate gearing. The transducer 46 provides an output pulse for each increment of rotation of the spindle. The transducer may be of the type disclosed in U.S. Pat. No. 3,069,608 which has three brushes so that the direction of rotation of the spindle may be interpreted from the time occurrence of pulses on these brushes. The transducer unit 46 performs this interpretation and cancels redundant pulses occurring as a result of vibration of the unit, and provides its output pulse train to a synchronizer 48 which brings the pulse timing into accord with the overall rate of operation of the system.

The output of the synchronizer 48 as well as the feed rate number from the unit 42 are provided to a feedrate interpolator 44. The interpolator 44 is preferably of the digital-differential-analyzer type disclosed in U.S. Pat. No. 3,128,374 and it operates to provide an output pulse train at a rate proportional to its input pulse train from the synchronizer 48 and the feedrate number from the unit 42. This is done by adding the feedrate number into a register each time a pulse is received from the transducer 46, and generating output pulses each time an overflow occurs from the register. The overflows will occur at a rate proportional to the input pulse rate and the magnitude of the feedrate number.

As has been noted the feedrate interpolator 44, as well as the other interpolators used in this system, are not part of the general purpose computer but are rather hard wired. This is done to avoid overburdening the general purpose computer with the simple but high rate interpolation process.

The output of the feedrate interpolator 44 is provided to an X axis interpolator 50 and an Z axis interpolator 52. These units also receive the delta X and delta Z numbers respectively from the decode and storage unit 32 and provide output pulse trains which are proportional to these numbers as well as to the feedrate pulse train from the interpolator 44. The output pulse train of the X axis interpolator is provided to an X axis servo drive 16, preferably of the phase-analog type described in the U.S. Pat. No. 3,011,110 which operates to provide one increment of output motion for each pulse received.

The pulse train output of the Z axis interpolator is similarly provided to the Z axis drive 18. Accordingly, the cutter 14 is moved along the X and Z axes at rates proportional to the command numbers contained in the particular block of tape being read as well as to the computed feedrate number.

The output of the unit 42 which calculates the feedrate number is also used to calculate an SFM number. This calculation is done by the general purpose computer at an appropriate point in its operation cycle but for purposes of illustration it is identified as being performed by unit 60. The calculation performed is:

$$SFM = CSK \cdot IPR^{CSQ}$$

The constants CSK and CSQ are taken from the introductory block as decoded and stored by the unit 32 and these constants are derived emperically by tests of the rotational cutting rate required to achieve a given tool life for a particular chipload. The equation was derived from a mathematical model of the cutting process and other equations which prove compatible with emperical data might also be used.

The computed SFM number is used, along with the signal representative of the radius of the cut being formed, to control the spindle speed. This computation is illustrated as being performed in a unit 62 which receives the output of an R store 64. The R store receives the X axis command pulses from the interpolator 50 and stores them in a bidirectional manner, to calculate a number equal to the effective cutting radius. This is provided to the unit 62 along with the SFM number. The SFM number is divided by the radius to generate an RPM number. The computed value of RPM is used to control the speed of the spindle drive 12.

In operation, the tape reader 30 decodes the introductory information contained in the first blocks of the control tape 28 and this information is decoded and stored by the general purpose computer with that function being localized, for purposes of illustration, in the decode and storage unit 32. The initial block of segment information is then read by the tape reader 30 and based on the programmed depth of cut a cutting force set point is calculated and is compared with the actual cutting force to develop an IPR number. This number (or its limiting value if the number exceeds a limit) is stored and used along with the delta X and delta Y information contained in the block being read to compute a feedrate number. The feedrate number is calculated to achieve a constant IPR independent of the length of the motion segment being commanded. This feedrate number is interpolated as a function of the rate of rotation of the spindle to derive feedrate commands for X and Z axis interpolators which generate pulse trains used to control the X and Z motions respectively. By this operation the commanded inches per revolution is achieved and the inches per revolution is periodically modified to move toward the set point IPR. If the hardness of the workpiece increases the IPR value will decrease and the system thus adaptively modifies to the hardness of the workpiece.

In order to achieve a constant tool life independent of these variations in IPR, the IPR number is used to calculate an appropriate SFM number. This number is operated upon as a function of the actual radius of the part being cut to develop an RPM number which controls the spindle drive. In this manner the inches per revolution number adapts to workpiece hardness and the spindle speed is modified to maintain a constant tool cutting life despite these variations in feedrate.

It is to be understood that the foregoing description is illustrative in nature and is not to be construed in a limiting sense.

Having thus described my invention, I claim:

1. A control system for a lathe having a rotary spindle and a cutter positionable with respect to said spindle, comprising: a source of numerical information relating to a desired path of motion of the cutter relative to the spindle; a drive system for positioning the cutter relative to the spindle; means for measuring the force exerted by the workpiece on the cutter; means for controlling the motion produced by said drive system as a function of the numerical information relating to the desired path and as a continuous function of said force; and means for modifying the spindle drive speed as a continuous function of the measured cutting force in such a manner as to achieve a predetermined cutter life.

2. The control system of claim 1 wherein the rate of motion produced by said drive system is a function of the spindle drive speed.

3. The control system of claim 1 wherein the numerical information includes information relating to the maximum safe force which may be exerted by the workpiece on the cutter and wherein the system includes means for controlling the motion produced by said drive system so as to cause the measured force exerted by the workpiece on the cutter to approach said maximum safe force.

4. The system of claim 1 wherein means are provided for computing a rate of motion of the cutter along said desired path as a function of said measured force and numerical information and said drive system is controlled as a function of the computed rate of motion.

5. The control system of claim 1 wherein said computed rate of motion is used to generate a pulse train that has a frequency proportional to the rate of spindle speed and that pulse train used along with said numerical information to control the motion produced by said drive system.

6. A control system for a lathe having a rotary spindle and a cutter positionable with respect to said spindle, comprising: a first rotary drive system for said spindle; a second drive means for positioning the cutter relative to the spindle along a pair of mutually perpendicular axes; a source of numerical information including information relating to the desired component of motion of the cutter along each of said axes; a pair of interpolators, one associated with each of said axes, each being operative to receive the numerical information relating to its respective axis and to generate control signals for the drive means for its respective axis; means for measuring the force imposed on the cutter; and means for controlling the rate of operation of the interpolators as continuous functions of both said measured force and the rate of rotation of the spindle.

7. The system of claim 6 wherein said numerical information includes information relating to the maximum allowable force which may be exerted between the workpiece and the cutter and the rate of operation of said interpolators is controlled as a function of the ratio between the actual measured force and the maximum allowable force.

8. The system of claim 6 wherein means are provided for modifying the spindle speed as a function of the measured cutting force to achieve a predetermined cutter life.

9. In a control system for a lathe having a rotatable spindle and a cutter positionable relative to the spindle, in combination: a source of numerical information including information relating to the commanded distance of movement of the cutter relative to the spindle, along a pair of mutually perpendicular axes, and, the depth of the cut being taken; means for measuring the force imposed by the cutter on the workpiece; means for deriving from the numerical information a desired value of the force exerted by the cutter on the workpiece; means for deriving a feed rate value from the actual measured cutting force and the calculated desired cutting force; means for controlling the motion of the cutter relative to the spindle in accordance with said feed rate value and said numerical information; and means for controlling the spindle speed as a function of the calculated feed rate.

10. The system of claim 9 wherein the means for controlling the spindle speed as a function of the calculated feed rate includes means for determining the radius of the cut being formed and for generating a control signal operative to produce a constant rate of motion between the cutter and the workpiece surface independent of the radius of the cut.

11. The system of claim 9 wherein the numerical information includes information relating to a programmed cutter life and the system includes means for determining the actual length of time that the cutter is used, comparing it with the programmed cutter life, and for generating an alarm at such time as the two are equal.

12. A control system for a lathe having a rotary spindle and a cutter positionable with respect to said spindle, comprising: a source of numerical data including first constants relating the feed rate of the cutter with respect to said spindle; means for measuring the force imposed on the cutter; and means for controlling the feed rate of the cutter with respect to the spindle in accordance with signals derived utilizing said first constants the rate of spindle rotation, and said measured force, so that a constant cutter force is achieved.

13. The system of claim 12 wherein the numerical information includes second constants relating the life of the tool to the feed rate, and means are provided for controlling the rate of rotation of the spindle as a function of numbers derived utilizing said second constants and said feed rate signals.

References Cited
UNITED STATES PATENTS

| | | | |
|---|---|---|---|
| 3,573,588 | 4/1971 | Geyer et al. | 318—571 |
| 3,548,172 | 12/1970 | Centner et al. | 82—2 B |
| 3,259,023 | 7/1966 | Rieger et al. | 318—39 |
| 3,473,424 | 10/1969 | Mascherra | 82—29 A |

LEONIDAS VLACHOS, Primary Examiner

U.S. Cl. X.R.

318—571; 235—151.11

UNITED STATES PATENT OFFICE
CERTIFICATE OF CORRECTION

Patent No. 3,720,120                    Dated March 13, 1973

Inventor(s) Hymie Cutler

It is certified that error appears in the above-identified patent and that said Letters Patent are hereby corrected as shown below:

Column 4, line 9 delete "10"; line 10 delete "12"; line 11 delete "14"; line 12 delete "60"; line 13 delete "18"; line 14 delete "16" and "14"; line 15 delete "20" and "22"; line 16 delete "24" and "18"; line 18 delete "12"; line 19 delete "16" and "18"; line 22 delete "28"; line 54 delete "30"; line 56 delete "32"; line 59 delete "30"; line 61 delete "32"; line 64 delete "32".

Column 5, line 8 delete "32" and "34"; line 11 delete "36"; line 19 delete "38"; line 20 delete "38"; line 21 delete "14"; line 29 delete "38"; line 56 delete "42"; line 58 delete "32"; line 65 delete "46"; line 66 delete "12"; line 66 delete "46"; line 72 delete "46"; line 75 delete "48".

Column 6, line 3 delete "48"; line 4 delete "42"; line 5 delete "44" (both occurrences); line 9 delete "48"; line 10 delete "42"; line 12 delete "46"; line 16 delete "44"; line 22 delete "44"; line 23 delete "50"; line 24 delete "52"; line 25 delete "32"; line 28 delete "44"; line 30 delete "16"; line 34 delete "18"; line 35 delete "14"; line 39 delete "42"; line 44 delete "60"; line 47 delete "32"; line 57 delete "62"; line 58 delete "64"; line 59 delete "50"; line 62 delete "62"; line 65 delete "12"; line 66 delete "30"; line 68 delete "28"; line 71 delete "32"; line 72 delete "30".

Signed and sealed this 19th day of March 1974.

(SEAL)
Attest:

EDWARD M. FLETCHER, JR.
Attesting Officer

C. MARSHALL DANN
Commissioner of Patents